(12) United States Patent
Bill

(10) Patent No.: US 7,243,104 B2
(45) Date of Patent: Jul. 10, 2007

(54) PERSONALIZING CONTENT USING AN INTERMEDIARY BRIDGE

(75) Inventor: David S. Bill, San Francisco, CA (US)

(73) Assignee: AOL LLC, Dulles, VA (US)

( * ) Notice: Subject to any disclaimer, the term of this patent is extended or adjusted under 35 U.S.C. 154(b) by 471 days.

(21) Appl. No.: 10/448,316

(22) Filed: May 30, 2003

(65) Prior Publication Data

US 2004/0243592 A1     Dec. 2, 2004

(51) Int. Cl.
*G06F 17/00* (2006.01)
(52) U.S. Cl. .............. 707/100; 700/94; 455/179.1
(58) Field of Classification Search ........... 700/94; 455/179.1; 707/100
See application file for complete search history.

(56) References Cited

U.S. PATENT DOCUMENTS

| | | | |
|---|---|---|---|
| 6,584,220 B2 * | 6/2003 | Lantrip et al. | 382/154 |
| 2002/0188838 A1 * | 12/2002 | Dean | 713/2 |
| 2003/0236582 A1 * | 12/2003 | Zamir et al. | 700/94 |
| 2004/0002310 A1 * | 1/2004 | Herley et al. | 455/179.1 |
| 2004/0117239 A1 * | 6/2004 | Mittal et al. | 705/10 |
| 2004/0189691 A1 * | 9/2004 | Jojic et al. | 345/720 |

OTHER PUBLICATIONS

Steven Michael Pierce "Scorebot: Theory and Design of an Automated Film Scoring Application", thesis submitted in accordance with the requirement for the degree of Master of Arts, The University of Leeds, Department of Music, Aug. 2000.*

* cited by examiner

*Primary Examiner*—John Breene
*Assistant Examiner*—Dennis Myint
(74) *Attorney, Agent, or Firm*—Fish & Richardson P.C.

(57) ABSTRACT

A user's access to content may be managed by determining a mood originating point for a present track for a user, with the mood originating point being related to a mood indicator for the present track, identifying a mood destination for a user playlist, the mood destination being related to a mood indicator for an end track that is targeted for the user, and calculating a mood transition from the mood originating point to the mood destination. The mood transition includes one or more intermediary tracks between the mood destination and the mood originating point, such that a quantified mood transition between two tracks in a user playlist including the present track, the intermediary tracks, and the end track, is less than an identified mood transition threshold.

39 Claims, 9 Drawing Sheets

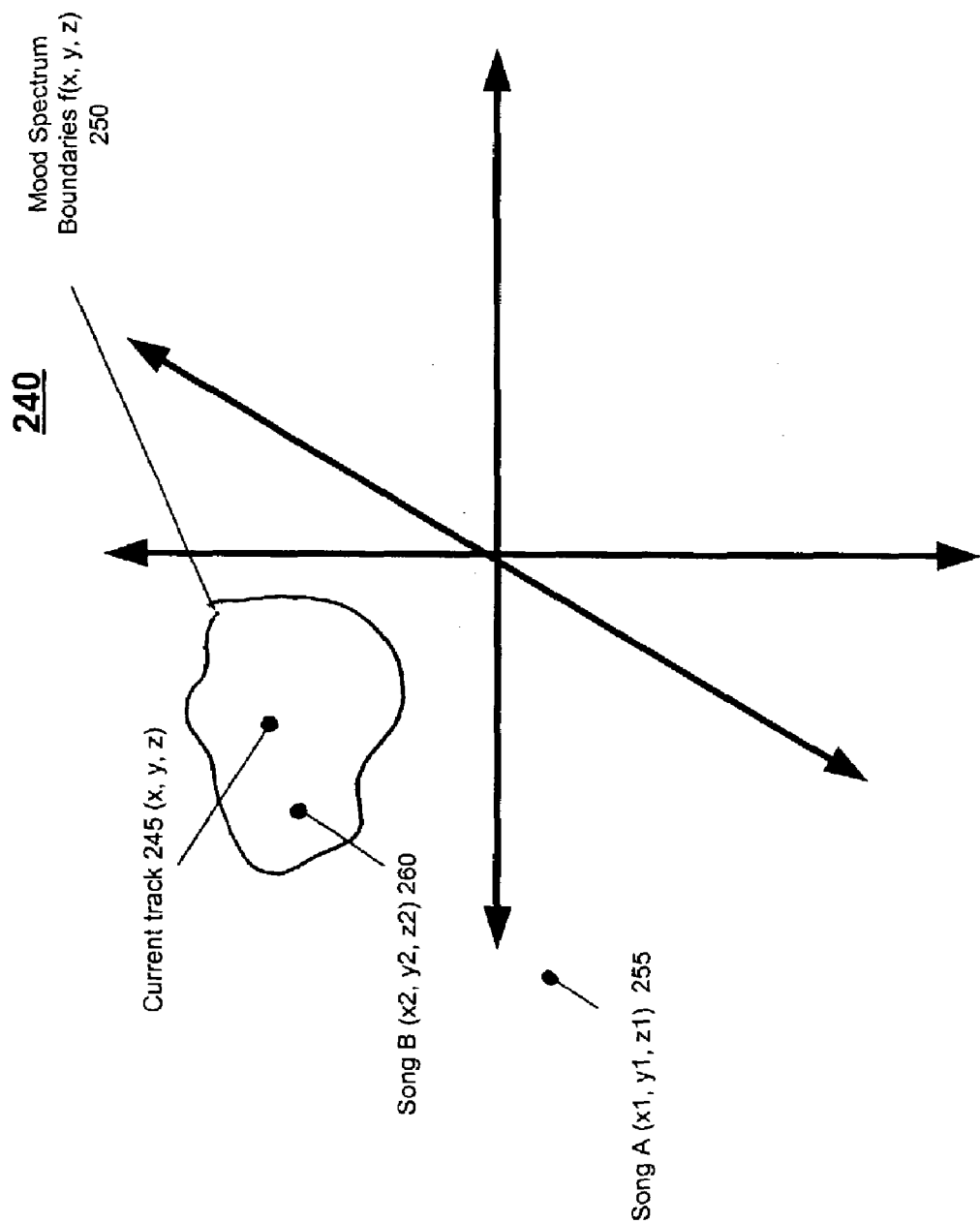

PERSONALIZING CONTENT USING AN INTERMEDIARY BRIDGE

TECHNICAL FIELD

This document relates to content selection.

BACKGROUND

Digital content is distributed on a wide variety of devices and in a wide variety of formats. The digital content may include movies, music, slides, games and other forms of electronic content.

SUMMARY

In one general sense, access to content by a user may be managed by determining a mood originating point for a present track for a user, with the mood originating point being related to a mood indicator for the present track. A mood destination for a user playlist is also identified, with the mood destination being related to a mood indicator for an end track that is targeted for the user. A mood transition from the mood originating point to the mood destination then is calculated. The mood transition includes one or more intermediary tracks between the mood destination and the mood originating point, such that a quantified mood transition between two tracks in a user playlist that includes the present track, the intermediary tracks, and the end track, is less than an identified mood transition threshold.

Implementations may include one of more of the following features. For example, the mood indicator for the present track or the end track may be determined by accessing a model of user mood states. Calculating the mood transition may include using a coordinate system to determine that the quantified mood transition lies within boundaries of a mood indicator for content acting as a baseline in determining the quantified mood transition. The identified mood transition threshold may vary asymmetrically with a mood indicator for content acting as a baseline in determining the quantified mood transition. The asymmetric mood transition threshold may reflect priorities for identifying a track.

The user may be enabled to access a playlist of the present track, the intermediary tracks, and the end track. Enabling the user to access the playlist may include transmitting the content in the playlist to the user. The mood originating point may indicate a mood of the content the user receives and/or the mood of the user.

An updated mood state for the user may be identified to determine if the updated mood state is compatible with a calculated mood state for the mood transition. Identifying the updated mood state for the user may be performed as the user is accessing the intermediary tracks. A new end track for the user may be selected when the updated mood state is incompatible with the calculated mood state. One or more new intermediary tracks may be selected when the updated mood state is incompatible with the calculated mood state.

Determining the mood originating point for the present track for the user, identifying the mood destination for the user playlist, and calculating the mood transition may include determining the mood originating point, identifying the mood destination, and calculating the mood transition for an audience of multiple users. Determining the mood originating point, identifying the mood destination, and calculating the mood transition for the audience may include modeling the audience based on aggregated mood state information from one or more individual members of the audience. Modeling the audience may include modeling the audience as a single member and/or sampling a subset of the audience and using one or more sampled results to calculate the mood transition. Modeling the audience may include modeling the audience as a collection of groups.

These and other aspects may be implemented by a system and/or a computer program stored on a computer readable medium, such as a disc, a client device, a host device, and/or a propagated signal. The system may include a host device, a client device, or componentry distributed on more than one system.

Other features will be apparent from the description and drawings, and from the claims.

DESCRIPTION OF DRAWINGS

FIG. 2C is a graph illustrating a three-dimensional mood management system that illustrates how mood consistency may be maintained using three or more factors.

DETAILED DESCRIPTION

The flexibility and power of communications networks and media software (e.g., streaming audio and video players) enable wider access to electronic content in addition to enabling new media products. The organization of content that is transmitted to a user may be referred to as a playlist. Typically, each playlist includes a collection of tracks, each of which may have an associated mood. For example, the associated mood may be a mood that a song inspires in the listening audience. Alternatively, the associated mood may indicate the mood of a listener who has requested the song or the "station." In yet another example, the mood may be described as a collection of attributes that include, for example, the tempo (e.g., slow), the theme (e.g., country), and the tone (e.g., deep male vocal). Regardless of the how the underlying mood is affiliated with the content, the content may be arranged so that a mood consistency is maintained between songs. Generally, a mood consistency relates to the likelihood that a user will elect to remain in the audience community as one selection of content ends and a second selection of content begins. For example, an Internet-based radio station may be using a server to distribute content. The server may organize the content so that a country rock song gauged to be uplifting is not interspersed between two country ballads gauged to be depressing if that sequence is determined to lose the listening audience. The automated arrangement of tracks may be referred to as a mood-based playlisting system.

Although the mood-based playlisting system may be easiest to understand when considering the operations of an Internet-based radio station that is selecting songs, the mood-based playlisting system may be used in a variety of contexts and with diverse content. Thus, the mood-based playlisting system may be used to select advertisements (including audio, video, and emerging media), video programming, and other forms of content (e.g., Web-based programming).

If maintaining mood consistency between two tracks appears to be difficult, the mood-based playlisting system may use one or more intermediate tracks to increase the likelihood of success between prior content (also called an originating point) and a targeted piece of content (the mood of which is referred to as a mood destination).

Figure 1:
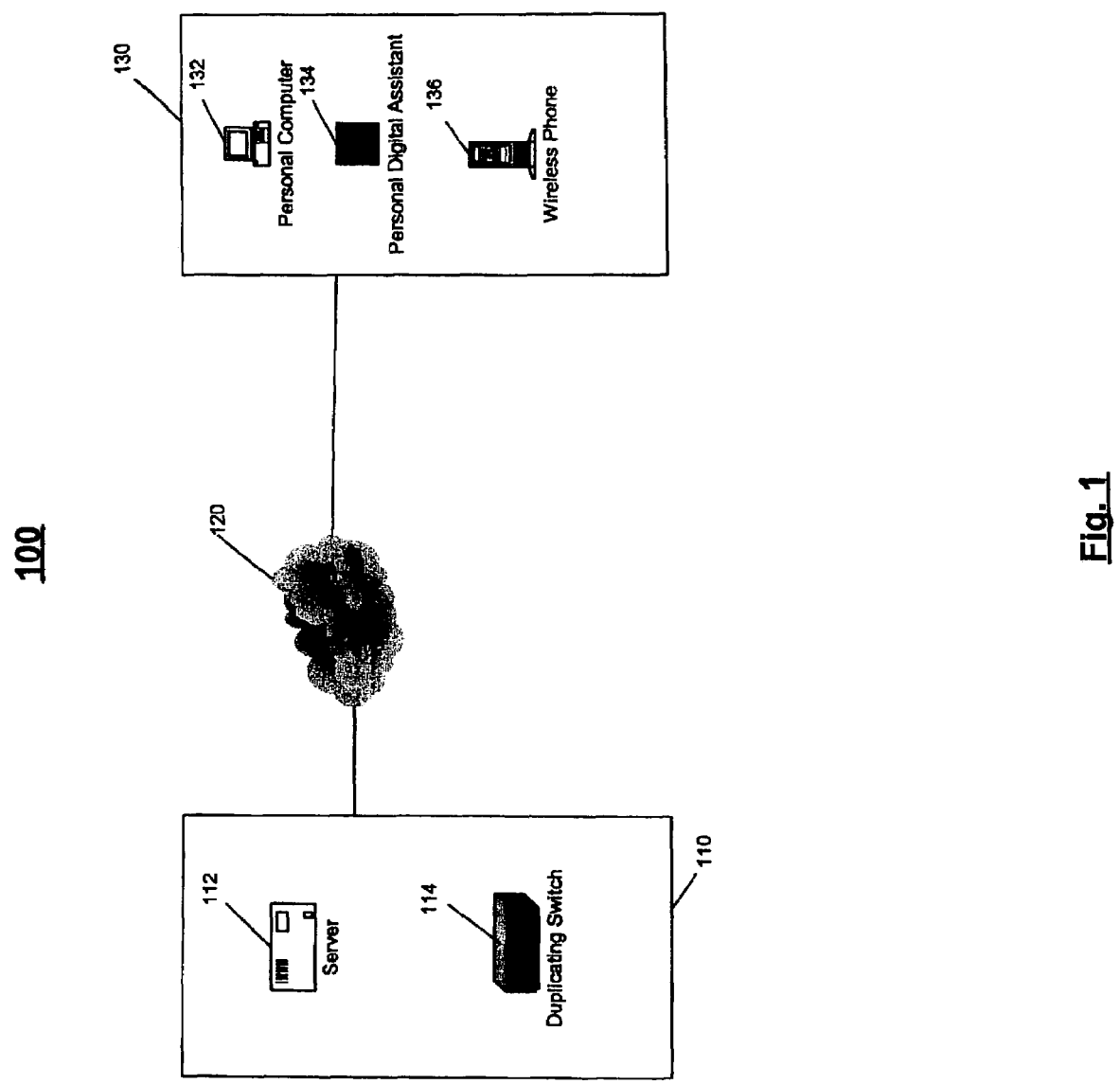
FIG. 1 is a block diagram of a communications system that enables electronic content to be distributed.

FIG. 1 illustrates a media-based communications system 100 that may distribute content electronically. The media-based communications system 100 includes a content source 110, a network 120, and a player 130. Although the media-based communications system 100 is shown as a network-based system, the media-based playlisting system may access media files residing in a standalone device or in a different configuration. For example, a mobile jukebox may play content in the form of music encoded in a media file format.

The content source 110 generally includes one or more devices configured to distribute digital content. For example, as shown, the content source 110 includes a server 112 and a duplicating switch 114.

Typically, a content source 110 includes a collection or library of content for distribution. Alternatively, or in addition, the content source may convert a media source (e.g., a video or audio feed) into a first feed of data units for transmission across the network 120. The content source 110 may include a general-purpose computer having a central processor unit (CPU), and memory/storage devices that store data and various programs such as an operating system and one or more application programs. Other examples of a content source 110 include a workstation, a server 112, a special purpose device or component, a broadcast system, other equipment, or some combination thereof capable of responding to and executing instructions in a defined manner. The content source 10 also may include an input/output (I/O) device (e.g., video and audio input and conversion capability), and peripheral equipment such as a communications card or device (e.g., a modem or a network adapter) for exchanging data with the network 120.

The content source 110 includes playlisting software configured to manage the distribution of content. The playlisting software organizes or enables access to content by a user community. For example, the content source 110 may be operated by an Internet radio station that is supporting a user community by streaming an audio signal, and may arrange a sequence of songs accessed by the user community.

The playlisting software includes mood-based playlisting software that maintains a consistent mood in selecting content. Generally, the mood-based playlisting software selects content so that any related mood transition between different content components is acceptable.

The content source includes a duplicating switch 114. Generally, a duplicating switch 114 includes a device that performs network operations and functions in hardware (e.g., in a chip or part of chip). In some implementations, the duplicating switch may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the device included in the duplicating switch may employ a Field Programmable Gate Array (FPGA). A FPGA is generally defined as including a chip or chips fabricated to allow a third party designer to implement a variety of logical designs on the chip. For example, a third party designer may load a FPGA with a design to replace the received IP addresses with different IP addresses, or may load the FPGA with a design to segment and reassemble IP packets as they are modified while being transmitted through different networks.

Implementations of the device included in the duplicating switch also may employ a network processor. A network processor is generally defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software to change an IP address of an IP packet on some of the RISC processors. Other RISC processors in the network processor may implement software that monitors which terminals are receiving an IP stream.

Although various examples of network operations were defined with respect to the different devices, each of the devices tends to be programmable and capable of performing the operations of the other devices. For example, the FPGA device is described as the device used to replace IP addresses and segment and reassemble packets. However, a network processor and ASIC are generally capable of performing the same operations.

The network 120 may include hardware and/or software capable of enabling direct or indirect communications between the content source 110 and the player 130. As such, the network 120 may include a direct link between the content source and the player, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The player 130 may include one or more devices capable of accessing content on the content source 110. The player 130 may include a controller (not shown) that processes instructions received from or generated by a software application, a program, a piece of code, a device, a computer, a computer system, or a combination thereof, which independently or collectively direct operations of the player 130. The instructions may be embodied permanently or temporarily in any type of machine, component, equipment, storage medium, or propagated signal that is capable of being delivered to the player 130 or that may reside with the controller at player 130. Player 130 may include a general-purpose computer (e.g., a personal computer (PC) 132) capable of responding to and executing instructions in a defined manner, a workstation, a notebook computer, a PDA ("Personal Digital Assistant") 134, a wireless phone 136, a component, other equipment, or some combination of these items that is capable of responding to and executing instructions.

In one implementation, the player 130 includes one or more information retrieval software applications (e.g., a browser, a mail application, an instant messaging client, an Internet service provider client, or an AOL TV or other integrated client) capable of receiving one or more data units. The information retrieval applications may run on a general-purpose operating system and a hardware platform that includes a general-purpose processor and specialized hardware for graphics, communications and/or other capabilities. In another implementation, player 130 may include a wireless telephone running a micro-browser application on a reduced operating system with general purpose and specialized hardware capable of operating in mobile environments.

The player 130 may include one or more media applications. For example, the player 130 may include a software application that enables the player 130 to receive and display an audio or video data stream. The media applications may include controls that enable a user to configure the user's media environment. For example, if the media application is receiving an Internet radio station, the media application may include controls that enable the user to select an Internet radio station, for example, through the use of "preset" icons indicating the station genre (e.g., country) or a favorite. In another example, the controls may enable the user to rewind or fast-forward a received media stream. For example, if a user does not care for a track on a particular station, the user may interface with a "next track" control that will queue up another track (e.g., another song).

The media application includes mood-based playlisting software. The mood-based playlisting software may work independently of, or in conjunction with, playlisting software residing on the content source 110. The mood-based playlisting software may mitigate the mood transition created when the content changes. In one example, the playlisting software permits the user to select from a recommended list of content that is consistent with the previous or present track. In another example, the mood-based playlist software may seamlessly manage the transition of content.

Figure 2A:
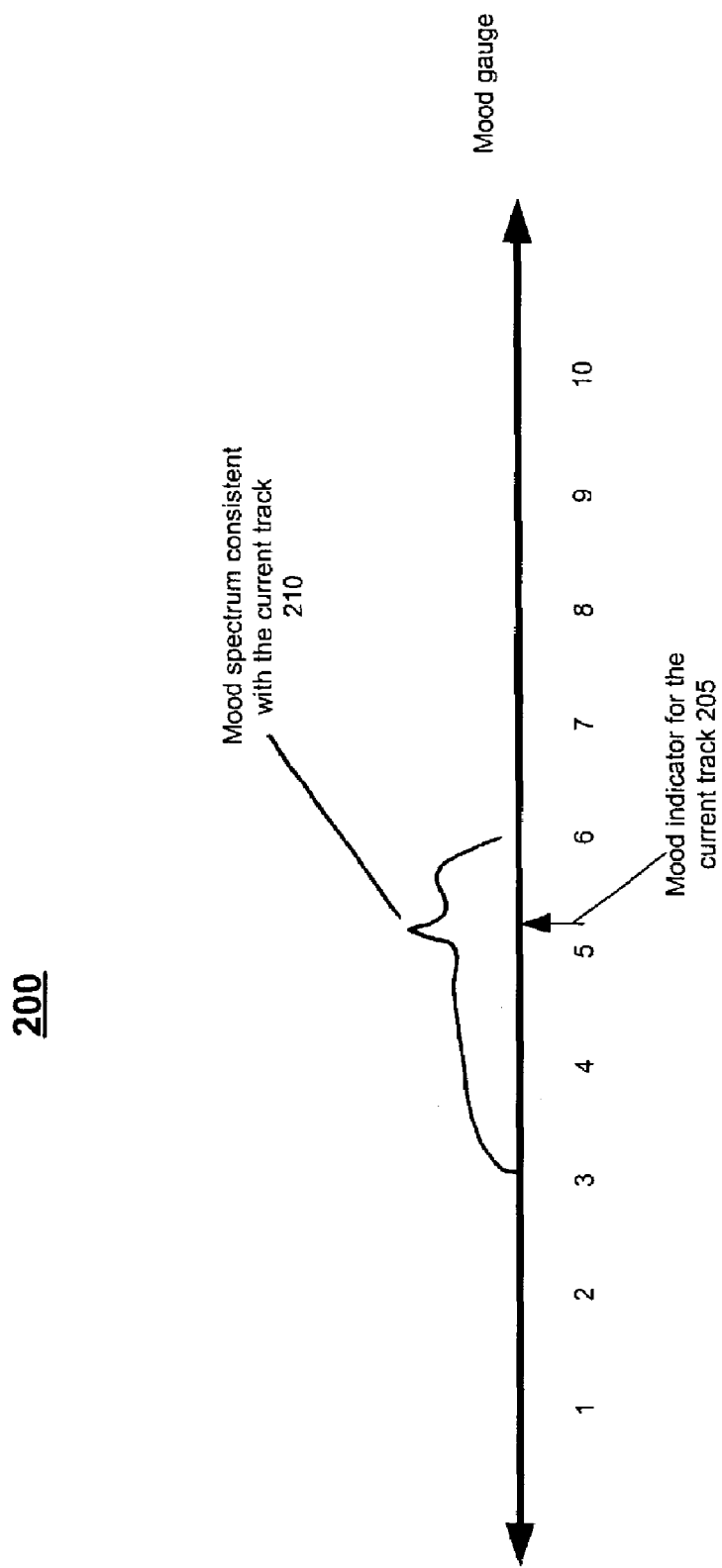
FIG. 2A is a graph of a mood spectrum that illustrates how a selection of content may be scored to quantify the mood in an automated manner.

FIGS. 2A–2D describe a mood modeling system that may be used by the systems described with respect to FIG. 1. FIG. 2A illustrates a mood spectrum 200 that may be used to determine a mood consistency between a selection of content and planned future content. Mood spectrum 200 has been abstracted to be independent of the underlying mood, and has been normalized in the range from 0 to 10. In mood spectrum 200, the mood indicator 205 for the current track has a value of approximately 5 on the mood spectrum 200. The mood indicator 205 for the current track is related to the mood spectrum 210 consistent with the current track, which indicates mood values for content that may be selected consistent with the mood value for the current track under consideration. In one example, the playlist and content selection is being planned and the current track under consideration has not been distributed. In another example, the current track under consideration has been or is being distributed (e.g., across the Internet by an Internet radio station).

Figure 2B:
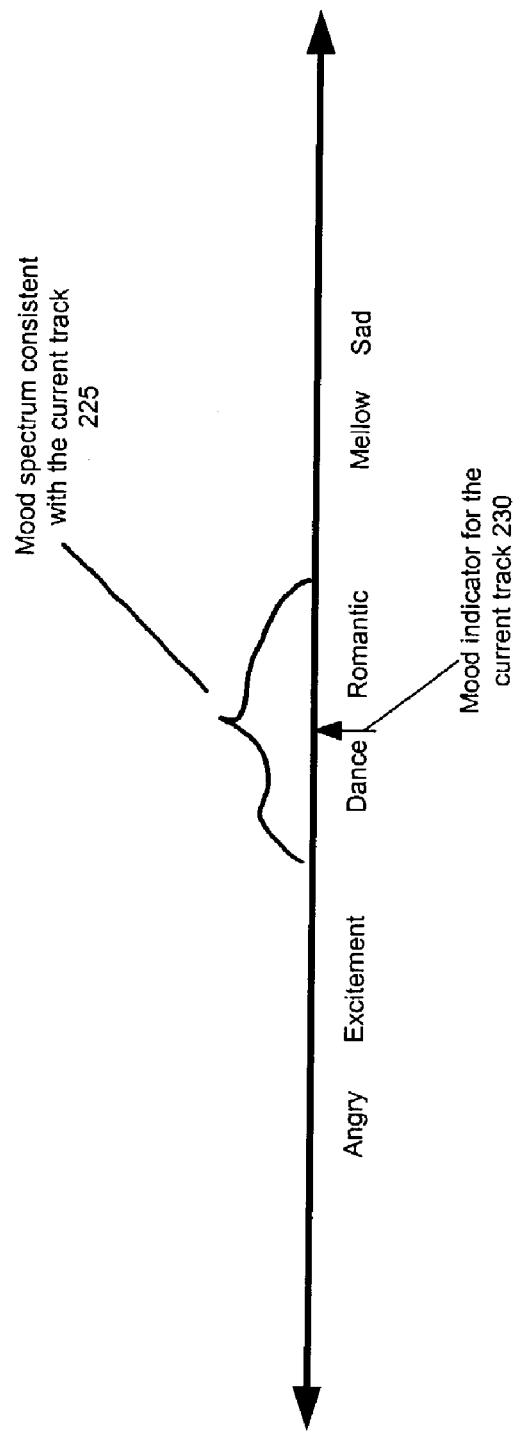
FIG. 2B is a graph illustrating how a mood spectrum and scoring system may be used to associate content with an actual mood.

FIG. 2B illustrates a graph 220 how content may be categorized using one or more moods and specifically describes how the mood indicator associated with a particular piece of content may span multiple moods. As shown, the moods include "angry," "excitement," "dance," "romantic," "mellow," and "sad." FIG. 2B uses a 1-dimensional axis to categorize content along the mood spectrum 225. Specifically, the content in FIG. 2B spans two of the moods, specifically, dance and romance. Other dimensioning systems relating to more than two moods may be used. For example, an X dimensional system may gauge X moods across X axes. Nevertheless, regardless of the number of axes that are used, a selection of content may be related to various moods to identify future content that is consistent with the mood of the content that has been selected.

FIG. 2B includes a mood indicator 230 for the current track. The mood indicator 230 describes a particular mood rating for a piece of content that has been identified. The content that has been identified may include a selection of content that is actually being played or one that is destined for one or more users. Alternatively, the mood indicator for a current track may be used to create a user playlist to better identify desired content deemed compatible for a user. As is shown in FIG. 2B, the mood indicator 230 for the current track lies within the mood spectrum 225 consistent with the current track. This mood spectrum 225 indicates that content that falls within dance and romantic themes is deemed consistent with the mood indicator for the current track.

In one implementation, the consistency with the current track and the identification of a particular mood spectrum may be determined by scoring the current track and a proposed next track and determining the relationship between the score for the current track and the score for the proposed next track. Alternatively, a selection of content may be associated with one or more discrete values that describe the content. For example, a song may be associated with letters, each of which describes one or more themes that may be used to characterize the song. Thus, as is shown in FIG. 2B, if D and R were used to identify, respectively, dance and romantic themes, a record describing the current track could have a D and a R in its record/metadata.

Referring to FIG. 2C, a three-dimensional mood management graph 240 is shown that illustrates how mood spectrum consistency may be determined across three factors, influences, or moods. Specifically, the three-dimensional coordinate system for the current track 245 is shown within a three-dimensional volume describing the mood spectrum boundary 250 as a function of three coordinates. Also shown is a first song 255 that does not fall within the volume of the mood spectrum boundaries 250 and a second song 260 that lies within the mood spectrum boundary 255. Thus, when content is being selected, if the mood spectrum boundary 250 is being used as the determining criteria, song 255 may be excluded as it lies outside the mood spectrum boundary 250, while song 260 may be included in the playlist as it lies within the mood spectrum boundary 250.

Depending on the implementation and the configuration, the mood spectrum boundary may represent a simpler function such as a cone or a sphere. For example, a sphere may be used to identify equidistant points that fall within a certain mood range of the current track. However, the mood spectrum boundary 250 need not include a simple function. For example, if detailed analytics are used to measure mood spectrum consistency and user response, a more detailed and non-symmetrical volume may be used to measure the mood spectrum boundary 250. One illustration of this may include content that may be very consistent across one axis for multiple themes, but inconsistent with minor changes across a different axis in mood spectrum. For example, if the content is being scored across lyrics, tempo and intensity, lyrics that may contain age-appropriate suggestions may only be consistent with content that is similarly appropriate for the identified age. In contrast, content that features a slower tempo may be consistent with music across multiple themes with a similar tempo. Accordingly, the function that describes the mood spectrum boundary 250 of the current track 240 may incorporate analytics that permit a small tolerable deviation in the lyrical deviation while also permitting a wider variation in the tempo axis.

Figure 2D:
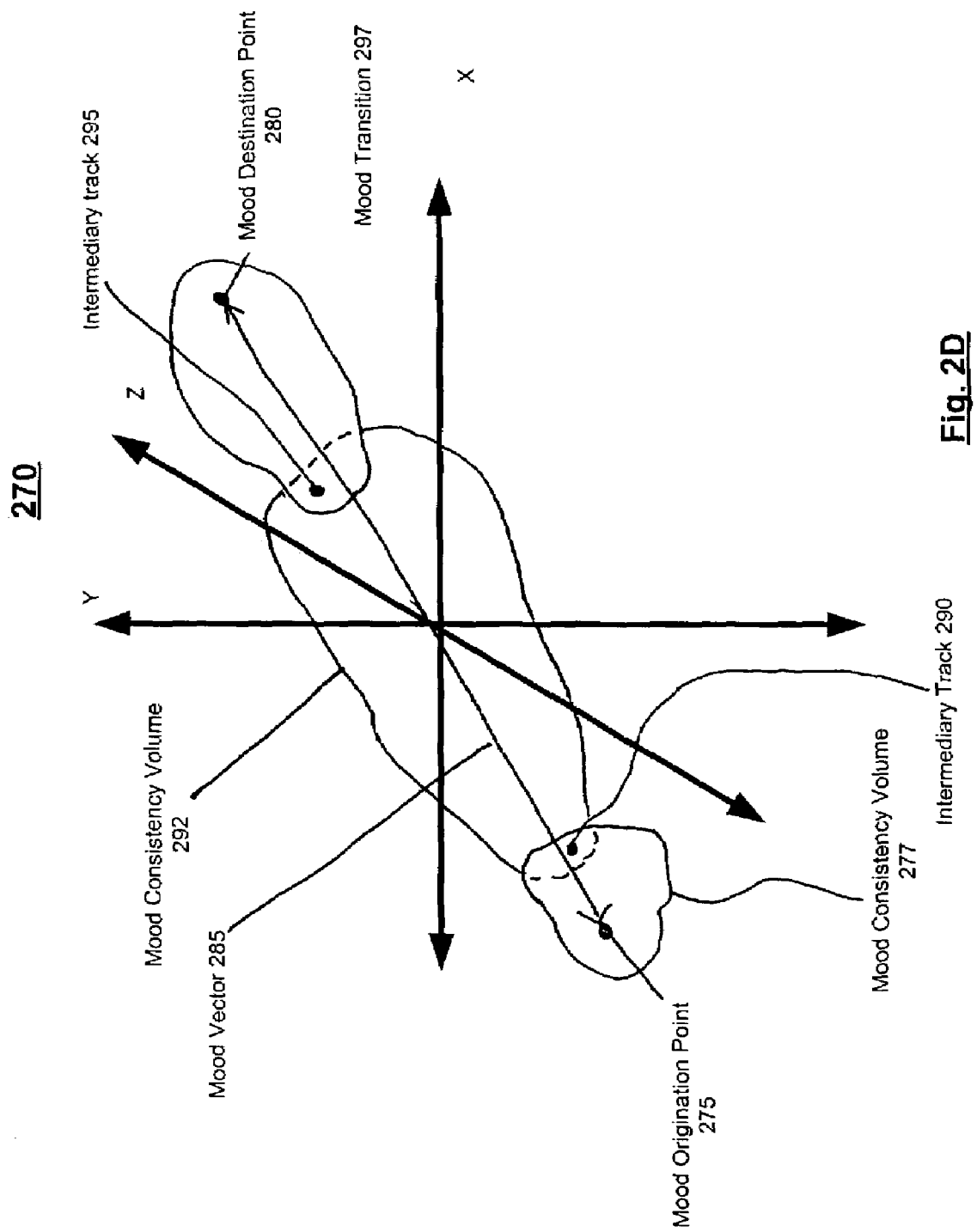
FIG. 2D is a graph illustrating how mood transitions may incorporate intermediate tracks to create a more successful transition in reaching a mood destination.

FIG. 2D illustrates a graph of a three-dimensional mood consistency scoring system 270 that illustrates how mood transitions may be planned so that the mood may be changed from a current mood originating point to a mood destination. The transitions may be structured such that a transition directly from a mood originating point to a mood destination that otherwise appears difficult or unsuccessful may be made more successful by using one or more intermediate transitions. Thus, the likelihood of a successful transition between the mood originating point and the mood destination point is increased.

Mood scoring system 270 illustrates a mood originating point 275 and a mood destination 280. The general mood transition that is required is illustrated by the vector 285 from the mood originating point 275 to the mood destination point 280. However, the mood consistency volume 277 for mood originating point 275 does not include the mood destination point 280. Accordingly, one or more intermediary tracks may be used to successfully transition one or more users to the mood destination point.

To accomplish this transition, intermediary track 290 is used as the next content selection to create a mood that is closer to the mood destination point 280, even though the consistency volume 292 for the intermediary track 290 does not actually reach or include the mood destination 280. After the intermediary track 290 is selected, a second intermediary track 295 is added to the playlist to move the current mood indicator closer to the mood destination 280. As is shown in FIG. 2D, the intermediary tracks 290 and 295 both lie within the same transition volume 292, thus preserving a consistent mood transition from the intermediary track 290 to the intermediary track 295. From the intermediary track 295, the system may transition directly to the mood destination point 280 and preserve the consistent mood as both the intermediary track 295 and the mood destination point 280 lie within the mood transition volume 297.

Although the transition from the mood originating point 275 to the mood destination point 280 features the use of two intermediary tracks, the implementation of a successful transition need not be limited to the two intermediary tracks that are shown. For example, depending on the configuration, no intermediary tracks may be required to successfully transition from the mood originating point 275 to the mood destination point 280. Alternatively, one, two, three, or more intermediary tracks may be used to successfully transition from the mood originating point 275 to the mood destination point 280.

The intermediary tracks need not resemble similar forms of content. For example, the mood originating point for the current track may include a song that is being transmitted, a first intermediary track may include a commercial, a second intermediary track may include a second song, and the mood destination point may relate to a planned advertisement that has been targeted for increased chances of success.

Also, the volumes that describe the mood consistency may be configured to reflect probabilistic chances of success and may change, based on the desired chance of success. For example, the mood consistency volume 277 may be planned on a model of mood consistency such that transitioning from the mood originating point 275 to the intermediary track 290 will preserve 90% of the audience upon that transition. Alternatively, if fewer intermediary tracks are desired, a larger mood consistency volume that covers more distance may be used based upon a modeled probability of 50%. Thus, in this model, fewer intermediary tracks may be required to reach the mood destination point.

Finally, the transitions that are shown may include real-time feedback to better predict the actual user response to be transitioned. For example, a test audience may be sent the intermediary track in advance of the larger audience. If the response of the test audience indicates that the transition is not as successful as was expected, an alternate path may be plotted to increase the chance that the transition will preserve the audience. For example, an intermediary track may be chosen that lies closer to the mood originating point. Another example of an alternative path that may be chosen includes a trusted transition that has been used previously and is associated with what is believed to be a higher success rate in transitioning.

Figure 3:
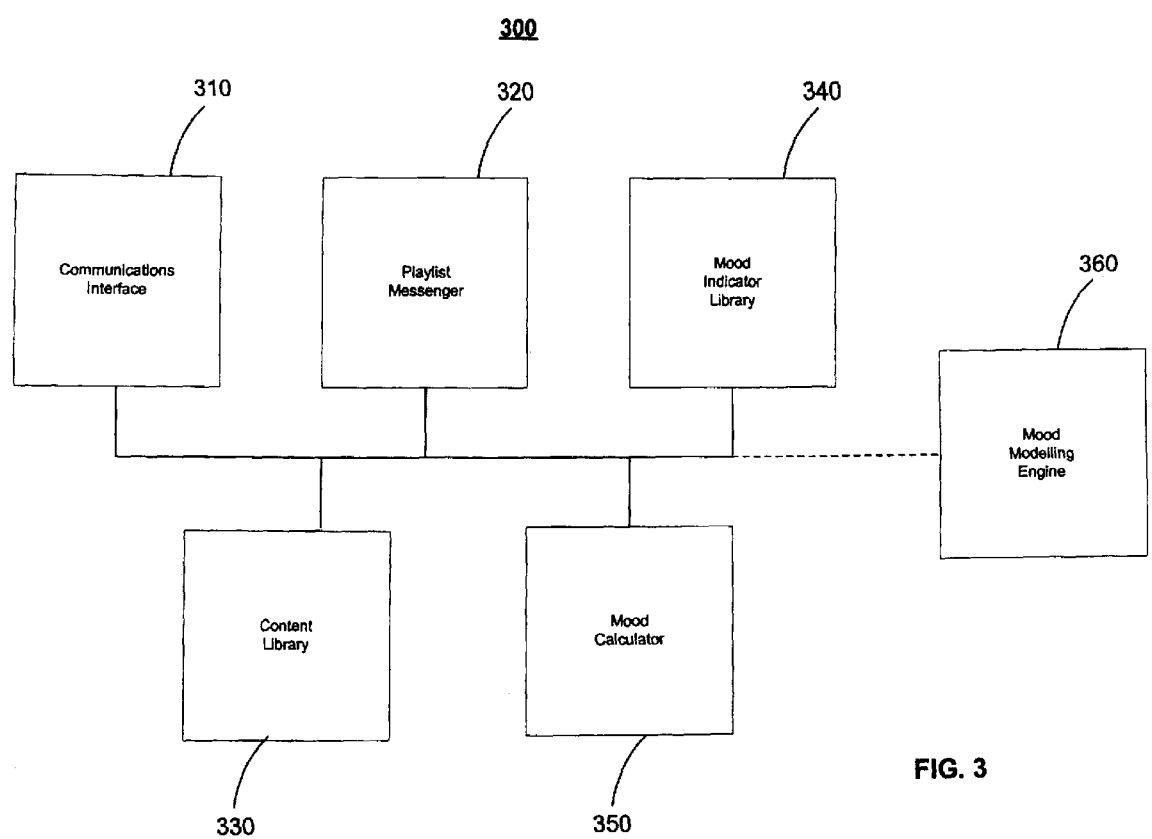
FIG. 3 is a block diagram of a mood-based playlisting system.

FIG. 3 illustrates a mood-based playlisting system 300 that may be used to generate a playlist with consistent moods between two or more selections. The mood-based playlisting system 300 includes a communications interface 310, a playlist manager 320, a content library 330, a mood indicator library 340, a mood calculator 350, and an optional mood-modeling engine 360. Generally, the mood base playlisting system 300 manages the playlist for one or more pieces of content to be transmitted to an audience. The communications interface 310 receives data describing the audience and one or more content goals to be incorporated, so that the playlist manager 320 may put together a playlist of selections from the content library 330 by using the mood indicator library 340 to determine a score for the content and maintaining consistency between the selected content using the mood calculator 350.

The communications interface 310 may be used to exchange data describing the audience that is being managed and/or to distribute playlist information. The communication interface 310 also may be used to receive updates to the content library 330, the mood indicator library 340, and different algorithms and models used by the mood calculator 350.

The communications interface 310 receives updates from one or more partners or other devices to exchange content for incorporation into a playlist. For example, a newly-released song may be distributed, along with advertisements for incorporation into the playlist. Similarly, mood indicator information related to the content and/or advertising to be distributed also may be received by the communications interface 310 for transmission to the mood indicator library 340. Audience data associated with content may be modeled, described electronically, and transmitted to the mood calculator 350 to better select content to be incorporated into the playlist. The playlist manager 320 includes a code segment that identifies content to be used in a playlist. For example, the playlist manager 320 may generate a playlist that describes a piece of content to be accessed and reference information so that the content may be accessed using the reference information.

Alternatively, the playlist manager 320 may generate a playlist to be used by a distribution point. For example, an Internet-based radio system may receive the playlist from the playlist manager for transmission to the listening audience. Depending on the configuration of the mood-based playlisting system and whether the mood-based playlisting system is determining the playlist and distributing the content, the playlist manager 320 also may transmit the content to be used in the playlist (e.g., through communications interface 310).

The content library 330 may include one or more selections of content for incorporation into a transmission for a receiving audience. Depending on the nature of the content, the content library may be adjusted to accommodate the particular media and/or audio demands. For example, the content library may include digitally encoded songs and related music videos for broadband users. The content library also may include metadata that describes the content. In the case of songs, the metadata may include, for example, artist, album, and track information. When the content library includes video information, the video information may include different bit rates for different audiences. Thus, a user with a high bandwidth connection may be able to access a selection encoded for a higher bit rate and having relatively higher quality, while a user with a slower connection may be able to access the same content encoded using a lower bit rate and having relatively lower quality. The content library and the metadata in the content library also may be associated with one or more rules that may be used in the content selection. Thus, a particular selection of content in the content library may have detailed licensing information that governs how the selection of content may be accessed. For example, a particular selection of content may be available for promotional purposes during a limited time and may be unavailable thereafter. Other examples of restrictions that may be incorporated in the content library include ASCAP licensing restrictions that control the number of times a selection or content may be accessed in a particular period, and preclude a selection of content from being accessed in a particular manner. For example, a selection of content may be precluded from being incorporated in a playlist twice in a row.

The mood indicator library 340 may include one or more values designed to describe the mood for a selection of content. Depending on the configuration of the mood-based playlisting system, different metrics may be stored in the mood indicator library 340. Thus, one example of the value stored in the mood indicator library may describe a selection of content and a mood indicator that scores the content in a specified numerical range. Another metric may include different values that indicate whether a selection of content is compatible with a chosen theme or genre.

Although the mood-based playlisting system has been described as maintaining consistency within a desired mood for a selection of content, other non-mood-based elements may be modeled and incorporated into the content selection process and stored in the mood indicator library. For example, a user pool may be divided into premium and non-premium communities. The premium community may be allowed to access exclusive content that is not available to the non-premium community. This premium status for content that may be available may be stored in the mood indicator library. Other non-mood-based metrics may be used.

The mood calculator 350 may be used to receive values describing a current playlist, access the mood indicator library 340, and assist the playlist manager 320 in generating the playlist. Depending on the configuration of the playlist manager 320, the structure of the mood calculator 350 may differ. For example, in one configuration, the playlist manager 320 may suggest a particular piece of content and poll the mood calculator 350 to determine if the selection of content is appropriate and consistent with the current mood. The mood calculator then may respond with an indicator of whether the suggested content is consistent.

Alternatively, the playlist manager 320 may provide an indicator of a current track that is being transmitted and may poll the mood calculator 350 for a suggested piece of content. In response, the mood calculator 350 may poll the mood indicator library 340 to retrieve a consistent piece of content. The mood calculator 350 then may transmit the identity of the consistent content to the playlist manager 320, which may retrieve the content from the content library 330.

As an optional element, the mood-based playlisting system 300 may include a mood-modeling engine 360. For example, as content is being added to the content library 330, the mood-based playlisting system 300 may interface with the mood-modeling engine 360 to determine and gauge the mood spectrum for the newly-added content. The mood-modeling engine 360 may use the communications interface 310 to develop an appropriate mood analytic for the newly added content. For example, the selected content may be sent to a testing code segment to determine an anticipated user response. Alternatively, the mood-modeling engine 360 may interface with the playlist manager to add the proposed content to a test group of listeners to gauge their response to the selected content.

Other analytics that may be used by the mood-modeling engine 360 may include content analysis that may evaluate lyrics, the tempo, or other elements relating to the content. In one example, the tempo for a newly-received piece of content may be "scored" using a frequency analyzer to determine the theme and mood with which the content is consistent.

Although the mood-based playlisting system 300 is shown as an interconnected group of sub-systems, the configuration of the mood-based playlisting system 300 may include elements that have allocated the functionality in a different manner. For example, the content library 330 may be co-located or merged with the mood indicator library 340. Thus, the mood indicator for a selection of content may be stored as an element of metadata residing with the content record. Alternatively, the elements described in mood-based playlisting system 300 may reside in a larger code segment with constituent code segments described by the elements shown in FIG. 3.

Figure 4:
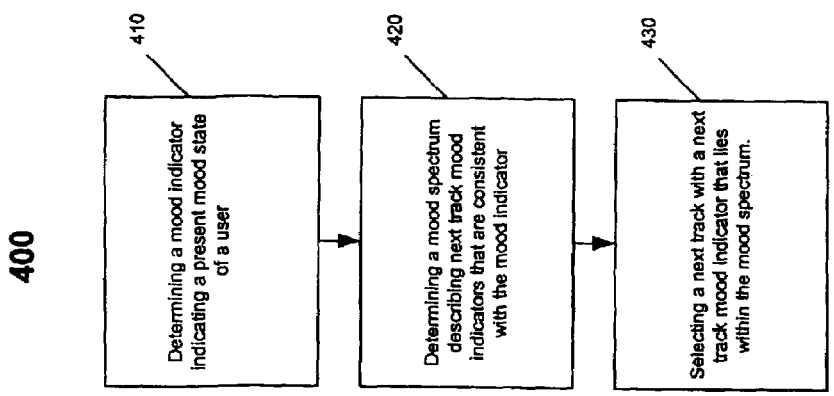
FIG. 4 is a flow chart showing how mood consistency may be maintained between two tracks.

FIG. 4 is a flow chart 400 that illustrates how a track of content may be selected in a way that maintains mood consistency. Specifically, the flow chart 400 may be implemented using the mood-based playlisting system such as was described previously. In general, a mood-based playlisting system determines a mood indicator that indicates a present mood state of a user (step 410), determines a mood indicator describing a next track mood spectrum that is consistent with the mood indicator for the current track (step 420) and selects a next track that lies within the next track spectrum for the current track (step 430).

Initially, the mood-based playlisting system determines a mood indicator that indicates a present mood state of a user (step 410). Typically, this will include creating a score that describes the track of content under analysis. For example, a song being distributed on the radio could be given a score from 0 to 10. In a multi-dimensional scoring system, the mood indicator could include a multi-dimensional coordinate that describes the mood indicator with regard to several variables.

The mood indicator may be determined in advance of distributing the track. For example, the system may assemble a user playlist with a sequence of tracks for distribution. This sequence may be distributed to distribution nodes (e.g., local radio stations or regional Internet servers). Alternatively, the mood indicator may be determined for a track that is being or has been distributed. For example, the mood indicator may be determined for a song that is being played over the airwaves.

A mood spectrum may be determined for the track for which a mood indicator has just been determined (step 420). The mood spectrum may be used to select the next track such that the next track lies within the boundaries of the mood spectrum. As has been described previously, the mood spectrum may include multiple variables and may relate to a likelihood of success that a user may stay with the current distribution (e.g., the same channel) upon the playing of the next content selection.

With the mood indicator and the mood spectrum for the current track determined, a next track is selected that lies within the mood spectrum (step 430). In one implementation, the next track may be selected by finding the track that is closest to the current track. For example, if the current track has a score of 5.17, the next closest track that may be selected may have a score of 5.18.

Alternatively, a content programmer may wish to have some variation within a mood spectrum, and the selection criteria may include a requirement that the next song differ by more than a specified variation threshold while still being within the specified mood spectrum. In the previous example, the content could be selected to be at least 0.5 units away from the current selection of 5.17 but still lies within the variation describing the mood spectrum of 1.0.

Within the range of values that are acceptable, the content may be selected randomly or the content may be selected based on identifying content that matches the criteria (e.g., is the furthest or closest away within the spectrum). If there is not a track that lies within the mood spectrum, the mood-based playlisting system 300 may alter its configuration to generate a selection of content. For example, the mood spectrum may be expanded so that more content lies within the mood spectrum. This may be accomplished by, for example, decreasing the threshold percentage of a success that is required in the transition or increasing the values that define the threshold for success. For example, if the mood spectrum only covered 70's rock, the mood spectrum may be expanded to include 70's and 80's rock.

Figure 5:
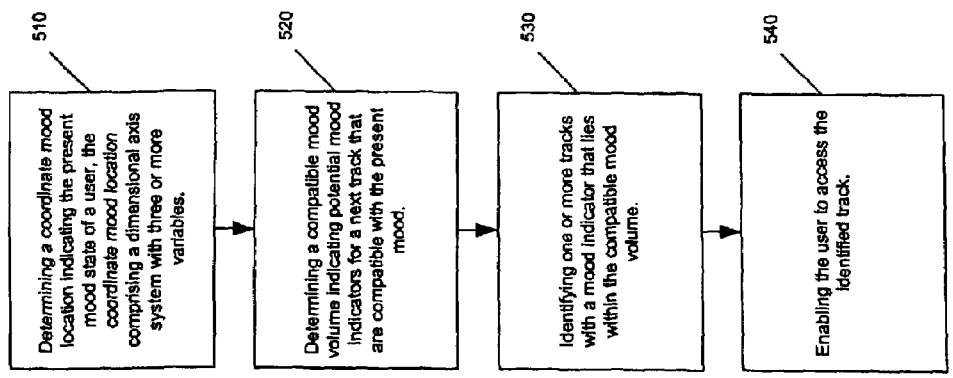
FIG. 5 is a flow chart showing how mood consistency may be maintained using a three-dimensional model to determine mood consistency.

FIG. 5 illustrates a flow chart 500 showing a mood-based playlisting system that incorporates a three-dimensional mood-based modeling system. In general, the three-dimensional mood-based playlisting system operates by determining a coordinate mood location for a current track that is being played. This may include or be described as the present mood state of a user. With the coordinate mood location determined, a compatible mood volume may be determined that describes future content selections that are deemed consistent with the present mood state. With the compatible mood volume identified, one or more tracks that lie within the compatible mood volume may be identified and a user may be able to access the identified tracks.

Initially, a coordinate mood location that indicates the present mood state of a content selection is determined (step 510). For example, the mood state may be described on X, Y and Z axes. In one example, the coordinate mood location is described in the context of the content that is being distributed. For example, the mood coordinates may measure the songs lyrics, tempo, and/or style. Alternatively, the coordinate mood location may also measure or describe the mood of the audience. For example, a particular song may be associated with a human emotion such as sadness, joy, excitement, or happiness. These human emotions may be measured independent of the underlying theme of the music. For example, some music whose theme is described as "golden oldies" may be associated with sadness while other music may be associated with joy.

With the coordinate mood location determined, a compatible mood volume describing compatible and consistent future content may be determined (step 520). For example, a sphere around a coordinate mood location may be identified that describes content compatible with the present track. With the compatible mood volume described, one or more tracks that lie within the mood volume may be identified (step 530). With the track identified, a user may be enabled to access the identified track (step 540).

Figure 6:
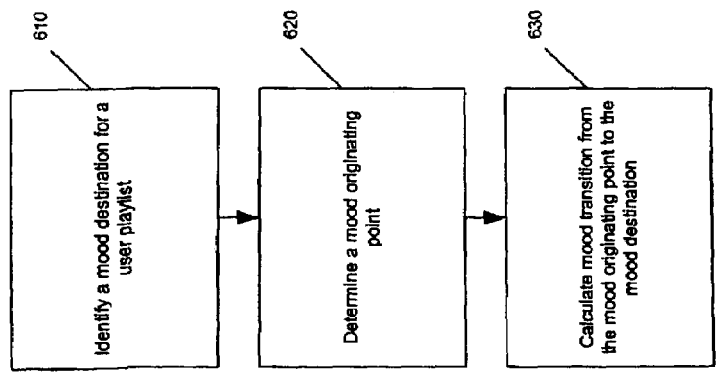
FIG. 6 is a flow chart showing how a playlist of content may be transitioned from a mood originating point to a mood destination using intermediate tracks.

In FIG. 6, flow chart 600 illustrates how an audience may be transitioned from an originating piece of content to a destination piece of content. This may be used, for example, to transition a user from a particular piece of programming (i.e., the originating content) to a targeted advertisement (i.e., the destination content) by tailoring the transitions from the originating content to the destination content. Accordingly, the likelihood of success and the effectiveness of the transition may be pursued.

Generally, the operations described in flow chart 600 may be performed using the systems and models described with respect to FIGS. 1–3. For example, the mood-based playlisting system 300 may be used to generate the playlist that transitions the user from the originating piece of content to the destination. Similarly, the transition and intermediate tracks described in FIG. 2D may be used to increase the effectiveness of the transitions. However, depending on the characteristics of the originating and destination content, the selection of the mood-based transition path may differ.

Generally, a mood-based playlisting system identifies a mood destination for a user playlist. A mood originating point is determined. With the originating point and destination paths known, a mood transition may be calculated from the mood originating point to the mood destination.

Initially, a mood destination for a user playlist is identified (step 610). Generally, identifying a mood destination includes identifying a selection of content to be included in the user playlist. For example, a distributor may wish to place a certain advertisement. Alternatively, a system administrator may wish to have an optimal lead-in for a particular piece of programming for the purpose of, for example, achieving optimal ratings for network content. This content to be inserted in the user playlist has an associated mood that relates to the content being distributed. In yet another example, a system administrator for a mood-based playlisting system may wish to have an optimal lead-in to increase the effectiveness and response of the audience to identified content that is to be transmitted in the future.

Separately or in parallel, a mood originating point may be determined (step 620). Determining a mood originating point may include identifying content that is being distributed or will be distributed to an audience prior to the transmission of the content associated with the mood destination. A mood originating point may be determined for the content that is being distributed. If the mood originating point differs from the mood destination of the content being transmitted (or to be transmitted), the resulting differential may create a mood transition that may create a less responsive result due to differences in the moods of the particular content. The mood transition from the mood originating point to the mood destination is calculated (step 630). Depending on the variation between the mood destination and the mood originating point, the transition may include one or more intermediary tracks. The intermediary tracks may be selected so that the mood metric for the intermediary tracks lies within the mood-consistency spectrum or volume of the previous track. Using the previous content or track as a baseline, the next content or track may be selected to minimize the number of intermediary tracks between the originating content and the destination content.

Other implementations are within the scope of the following claims. For example, although the mood-based playlisting system has been described in the context of a distributed system that may support multiple devices, the mood-based playlisting system may be distributed across multiple systems and/or reside at a client device. One example of the mood-based playlisting system being distributed across multiple devices may include having a portion of the mood-based playlisting system that operates in a data center where the content library and mood indicator library reside. These data center systems may interface with software that operates a mood calculator and content retrieval program to retrieve the content library from the central systems.

Alternatively, the mood-based playlisting system may be more client-focused and may perform more operations on the client. For example, the mood-based playlisting system described in FIG. 3 may be implemented on a personal audio system. The personal audio system may store multiple selections of content in memory and generate the playlist that maintains the mood of the content that has been stored. Alternatively, the mood-based playlisting system may include a network-based device that implements the content selection and playlisting on the client device but retrieves content from a network-based content library.

The mood-based playlisting system may be configured to preserve some measure of variation within the playlist. Thus, the mood-based playlisting system may be configured to recognize that if three country ballads having moods that have been gauged as depressing are played, the playlist should then select a country song having a mood that has been gauged as uplifting. These variation rules may be described digitally and distributed as programming criteria alongside or in conjunction with other licensing restrictions. For example, a license may govern the frequency with which an artist or song may be played. In addition to the frequency licensing restrictions, the content distributor may distribute a mood-based playlisting rule set along with an electronic library to regulate access to the content.

Although the mood has been described in the context of content being played, other techniques may be used to infer the mood. For example, the client device may monitor how the user interfaces with the media player. Monitoring a volume level, monitoring changes to the volume level, and monitoring whether a user changes an Internet radio station are examples of operations that may be used to infer the mood. For example, when a media player detects that a user reduces the volume level when a new track begins, the media player may determine that the user is experiencing a less intense mood. In contrast, when the user increases the volume, the media player may determine that the user's mood intensifies.

The user interaction with the media player also may be analyzed with respect to the content that is accessed. For example, if the user skips to the next track immediately after accessing a new track, the media player may determine that the user's mood does not like the skipped track. The user's action may be extrapolated so that a mood that is the inverse of the mood of the rejected content is inferred. To illustrate, a user may initially select a country music Internet Radio station. The sequence of content transmitted to the user may include a country rock song, followed by a country ballad, followed by a country rock song. When the user listens to the first country rock song, skips the country ballad, and listens to the second country rock song, the media player (or host) may determine that the user's mood reflects a preference for country rock.

Although the description of a mood indication made distinctions between the style and genre, the mood indications also may be made with respect to other factors, including the artist, the tempo, the era in which the content originated, the album, and/or other categorization. For other forms of media (e.g., video or data), the mood indications may include moods related to the identity of the producer, director, actors, and/or content rating (child, teen, all-ages) in addition to the category of the programming.

Analyzing the user's interactions to determine the mood is not limited to the user's interaction with a media player. A user's interaction with an Instant Messaging program, an electronic mail program, or an Internet Web browser are examples of other user activities that may be used to determine the mood. Thus, when a user is typing quickly and exchanging messages with many other users, an intense mood may be inferred. In contrast, when the user is determined to be reading web pages at a slower pace, a relaxed mood may be inferred. The content in the user interaction also may be used in determining the mood. Thus, the content appearing in a web page accessed by the user may be used to determine the mood for the user.

Although many of the previously described examples link a certain activity or type of content with a certain mood, the examples illustrate just one mood that can be associated with an activity. Other moods may be associated with the activity or type of content. A selection of content or a user activity also may be associated with multiple moods. An example of content with multiple moods may include a song with an uplifting melody and depressing lyrics. A mood-based playlisting system may use either or both moods in selecting future content. If the mood-based playlisting system sought to place an advertisement/product with the uplifting mood indication, the mood-based playlisting system may incorporate the uplifting mood in the transition. If the mood-based playlisting system did not have an intended mood destination in mind, the mood-based playlisting system may continue to select content with multiple mood elements to allow for an easier transition to a wider variety of content. A larger mood volume may represent the multiple elements with greater dimensions across multiple axes.

Although the mood-based playlisting system has been described using playlists, the mood-based playlisting system need not assemble an actual playlist of songs. Rather, the content selection may be made on a selection-by-selection basis. The list of songs selected in this manner may form a playlist.

Although the mood-based playlisting system has been described in the context of determining the mood state for a user, the mood-based playlisting system may be used to determine a mood state and select content for a group of users. This may include selecting content for large Internet audiences. For example, the individual mood states for individual members of a large audience may be aggregated to determine a collective mood state for the large audience.

In one example, the determining collective mood state may include sampling individual members of the audience for their mood states and using the sampled mood information to generate a collective mood state. In another example, an audience listening to one content source may be analyzed as a collection of groups. The mood-based playlisting system may analyze each individual group to determine whether the mood state of the group is consistent with the content being selected. When the mood state for one of the groups indicates that the mood state for the group is not compatible with the mood state for a content selection, the mood-based playlisting system may reconfigure the selection of content. In one example, the group experiencing the mood state incompatibility may be transitioned to a different stream/playlist to preserve the mood state compatibility. In another example, the mood-based playlisting system may select different content designed to retain the group experiencing the mood state incompatibility. This may include determining that more users are likely to be retained from the group experiencing the mood state incompatibility than are lost from other groups not experiencing the mood state incompatibility.

The mood-based playlisting system may disperse and group users. Users may be grouped to reduce costs, to take advantage of discounts for larger audiences, and to allow a limited pool of content to serve a larger community. This may include transmitting the same advertisement or segment lead to multiple users. The mood-based playlisting system also may disperse users from a common group. For example, a group of users may be accessing a host to access a popular selection of content. The mood-based playlisting system then may personalize the content based on the determined mood so that the users are retained at a higher rate using the mood-based playlisting system.

The mood-based playlisting system may normalize a mood indication to a designated location or region. The normalization may be done irrespective of whether targeted content is designated for the user. For example, the mood-based playlisting system may determine that operating a playlist in a certain mood spectrum or volume retains listeners at a greater rate. In another example, the mood indication for the user is operated in a specified range so that the user may be more receptive to communications delivered through other channels. This may include, for example, an advertisement on television, an electronic mail message, a telephone call, a Web-based advertisement, or an instant message. In yet another example, an advertiser may want a certain mood to be associated with a product. For example, a marketing firm may want a 'happy' mood associated with the firm's content.

When calculating a mood transition, the mood-based playlisting system may reexamine the actual mood state during the transition and determine if the actual mood state matches the intended mood state. For example, although the mood state of the content may indicate that a user should be in a relaxed mood, the user's activities on their client may indicate that the user's mood state is not mellow (e.g., the user is experiencing stress or anxiety). The mood-based playlisting system may dynamically respond to the actual mood state. In one example, the mood-based playlisting system may select content associated with a different mood destination that is more compatible with the user's actual mood state. Thus, instead of playing an advertisement associated with a mellow mood, the mood-based playlisting system may select an advertisement with a mood that is compatible with the actual mood of the user.

The mood based-playlisting system may include a detailed records system for reporting and accounting. For example, the mood-based playlisting system may record the moods of the user, the mood transition between tracks, and the percentage of users that are retained for the transition. Other records may include advertising effectiveness based on the mood, and user listening habits (e.g., duration, user preferences). The records may be refined in an automated manner to develop mood trending information. The mood-based playlisting system may generate automated reports for system administrators and advertisers to improve the enjoyment, effectiveness, and/or success of the mood-based playlisting system. This may include a report indicating that a different programming sequence may result in an increased response rate to an advertisement.

The mood-based reporting system may transmit several different sequences of content to determine the relative efficacy of the different sequences. The mood-based reporting system then may present the results to a system administrator and enable the system administrator to control future content selection using the reported relative efficacy information. The reporting system may present results using different mood metrics. For example, a first report may be based on only the mood of the content while a second report may gauge the user interaction with the media player. The reporting system then may analyze the differences, and interpret the variation. The interpretation of the variation then may be used by a system administrator to plan future programming.

What is claimed is:

1. A method of managing content accessed by a user, the method comprising:
   determining a mood originating point for a present track for a user, the mood originating point being related to a mood indicator for the present track;
   identifying a mood destination for a user playlist, the mood destination being related to a mood indicator for an end track that is targeted for the user;
   calculating a mood transition from the mood originating point to the mood destination, the mood transition comprises one or more intermediary tracks between the mood destination and the mood originating point, such that a quantified mood transition between two tracks in a user playlist comprising the present track, the intermediary tracks, and the end track is less than an identified mood transition threshold; and
   enabling the user to access the one or more intermediary tracks.

2. The method of claim 1 further comprising determining the mood indicator for the present track or the end track by accessing a model of user mood states.

3. The method of claim 1 wherein calculating the mood transition includes using a coordinate system to determine that the quantified mood transition lies within boundaries of a mood indicator for content acting as a baseline in determining the quantified mood transition.

4. The method of claim 1 wherein the mood transition threshold varies asymmetrically with a mood indicator for content acting as a baseline in determining the quantified mood transition.

5. The method of claim 4 wherein the asymmetric mood transition threshold reflects priorities for identifying a track.

6. The method of claim 1 further comprising enabling the user to access a playlist of the present track, the intermediary tracks, and the end track.

7. The method of claim 6 wherein enabling the user to access the playlist includes transmitting the content in the playlist to the user.

8. The method of claim 1 wherein the mood originating point indicates a mood of the content the user receives.

9. The method of claim 1 wherein The mood originating point indicates the mood of the user.

10. The method of claim 1 further comprising enabling the user to access the intermediary tracks.

11. The method of claim 1 further comprising identifying an updated mood state for the user to determine if the updated mood state is compatible with a calculated mood state for the mood transition.

12. The method of claim 11 wherein identifying the updated mood state for the user is performed as the user is accessing the intermediary tracks.

13. The method of claim 11 further comprising selecting a new end track for the user when the updated mood state is incompatible with the calculated mood state.

14. The method of claim 11 further comprising selecting one or more new intermediary tracks when the updated mood state is incompatible with the calculated mood state.

15. The method of claim 1 wherein determining the mood originating point for the present track for the user, identifying the mood destination for the user playlist, and calculating the mood transition includes determining the mood originating point, identifying the mood destination, and calculating the mood transition for an audience of multiple users.

16. The method of claim 14 wherein determining the mood originating point, identifying the mood destination, and calculating the mood transition for the audience includes modeling the audience based on aggregated mood state information from one or more individual users in the audience.

17. The method of claim 15 wherein modeling the audience includes modeling the audience as a single user.

18. The method of claim 15 wherein modeling the audience includes sampling a subset of the audience and using one or more sampled results to calculate the mood transition.

19. The method of claim 15 wherein modeling the audience includes modeling the audience as a collection of groups.

20. A content media-based communications system comprising:
an origination code section structured and arranged to determine a mood originating point for a present track for a user, the mood originating point being related to a mood indicator for the present track;
an identification code segment structured and arranged to identify a mood destination for a user playlist, the mood destination being related to a mood indicator for an end track that is targeted for the user;
a calculation code segment structured and arranged to calculate a mood transition from the mood originating point to the mood destination, the mood transition comprises one or more intermediary tracks between the mood destination and the mood originating point, such that a quantified mood transition between two tracks in user playlist comprising the present track, the intermediary tracks, and the end track, is less than an identified mood transition threshold; and
an access code segment structured and arranged to enable the user to access the one or more intermediary tracks.

21. The system of claim 20 further comprising a mood modeling engine structured and arranged to determine the mood indicator for the present track or the end track by accessing a model of user mood states.

22. The system of claim 20 wherein the calculation code segment is structured and arranged to use a coordinate system to determine that the quantified mood transition lies within boundaries of a mood indicator for content acting as a baseline in determining the quantified mood transition.

23. The system of claim 20 wherein the mood transition threshold used varies asymmetrically with a mood indicator for content acting as a baseline in determining the quantified mood transition.

24. The system of claim 22 wherein the asymmetric mood transition threshold reflects priorities for identifying a track.

25. The system of claim 20 further comprising a communications interface structured and arranged to enable the user to access a playlist of the present track, the intermediary tracks, and the end track.

26. The system of claim 24 wherein the communications interface is structured and arranged to transmit the content in the playlist to the user.

27. The system of claim 20 wherein the mood originating point indicates a mood of the content that the user receives.

28. The system of claim 20 wherein the mood originating point indicates the mood of the user.

29. The system of claim 20 further comprising a communications interface structured and arranged to enable the user to access the intermediary tracks.

30. The system of claim 20 further comprising an updating code segment structured and arranged to identify an updated mood state for the user to determine if the updated mood state is compatible with a calculated mood state for the mood transition.

31. The system of claim 29 wherein the updating code segment is structured and arranged to identify the updated mood state for the user is performed as the user is accessing the intermediary tracks.

32. The system of claim 29 further comprising an alternate end track selection code segment structured and arranged to select a new end track for the user when the updated mood state is incompatible with the calculated mood state.

33. The system of claim 29 further comprising an alternate intermediary track code segment structured and arranged to select one or more new intermediary tracks when the updated mood state is incompatible with the calculated mood state.

34. The system of claim 20 wherein the origination code segment, the identification code segment, and the calculation code segment are structured and arranged to determine the mood originating point, identify the mood destination, and calculate the mood transition for an audience of multiple users.

35. The system of claim 20 wherein the origination code segment, the identification code segment, and the calculation code segment are structured and arranged to model the audience based on aggregated mood state information from one or more individual users in the audience.

36. The system of claim 34 wherein the origination code segment, the identification code segment, and the calculation code segment are structured and arranged to model the audience as a single user.

37. The system of claim 34 wherein the origination code segment, the identification code segment, and the calculation code segment are structured and arranged to sample a subset of the audience and using one or more sampled results to calculate the mood transition.

38. The system of claim 34 wherein the origination code segment, the identification code segment, and the calculation code segment are structured and arranged to model the audience as a collection of groups.

39. A content media-based communications system comprising:
- means for determining a mood originating point for a present track for a user, the mood originating point being related to a mood indicator for the present track;
- means for identifying a mood destination for a user playlist, the mood destination being related to a mood indicator for an end track that is targeted for the user;
- means for calculating a mood transition from the mood originating point to the mood destination, the mood transition comprises one or more intermediary tracks between the mood destination and the mood originating point, such that a quantified mood transition between two tracks in user playlist comprising the present track, the intermediary tracks, and the end track, is less than an identified mood transition threshold; and
- means for enabling the user to access the one or more intermediary tracks.

* * * * *